United States Patent Office 3,663,508
Patented May 16, 1972

3,663,508
MODIFIED POLYESTERS AND SHAPED
STRUCTURES MADE THEREFROM
Heinzhorst Möbius, Frankfurt am Main, Günter Keil, Lorsbach, Taunus, and Franz Jakob, Hofheim, Taunus, Germany, assignors to Hoechst Fibers Incorporated, Spartanburg, S.C.
No Drawing. Filed Sept. 3, 1968, Ser. No. 757,163
Claims priority, application Germany, Feb. 10, 1968,
P 16 94 244.2
Int. Cl. C08g 17/14
U.S. Cl. 260—49　　　　　　　　　　　　　　　12 Claims

ABSTRACT OF THE DISCLOSURE

The present invention relates to novel modified polyesters containing in the polymer molecule 0.1 to 10 mol percent of sulfonate groups-containing chain members of the general formula

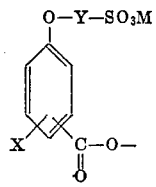

having an improved affinity for cationic dyestuffs and to filaments, fibers and films made of the said polyesters.

---

The present invention relates to novel modified polyesters containing in the polymer molecule 0.1 to 10 mol percent of sulfonate groups containing chain members of the general formula

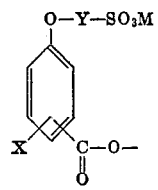

having an improved affinity for cationic dyestuffs and to filaments, fibers and films made of the said polyesters.

Linear polyesters made in known manner from dicarboxylic acids or ester-forming derivatives thereof and diols, for example polyethylene terephthalate or the polyester of terephthalic acid and 1,4-dimethylolcyclohexane only contain a small number of reactive terminal groups and hence, they have a small affinity only for conventional deystuffs. It has been proposed to improve the affinity for cationic dyestuffs by incorporating into the polymer chain monomer units containing anionic groups, for example sulfonate or phosphonate groups. Monomers containing certain sulfonate groups and copolyesters containing such monomers have been described in U.S. Pats. 3,018,272, 3,164,566, 3,164,567, 3,164,570, 3,166,531, 3,184,434, 3,185,671, 3,238,180, 3,301,819 and 3,328,484.

The present invention provides novel fiber-forming synthetic linear polyesters containing in the polymer molecule chain members carrying sulfonate groups, which polyesters contain in the polymer molecule 0.1 to 10 mol percent, calculated on the polymer units consisting of dicarboxylic acid moiety and diol moiety, of at least one chain member of the general formula

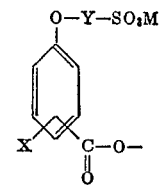

in which
M stands for an alkali metal
Y is an alkylene radical having 3 to 4 carbon atoms at least 3 of which are in the straight chain and
X, standing in meta or para position with respect to the radical —O—Y—SO₃M, represents the group

or hydrogen.

The radical of Formula I incorporated into the polyester according to the invention contains as substituents M an alkali metal. For preparing the sulfonic acid salts lithium, sodium, potassium, rubidium or cesium can be used, lithium, sodium and potassium being preferred because of the better accessibility.

The sulfonate group is linked to the aromatic nucleus via oxygen and the radical Y representing an alkylene radical having 3 to 4 carbon atoms at least three of which are in the straight chain.

Suitable alkylene radicals are

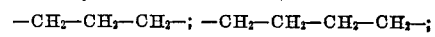
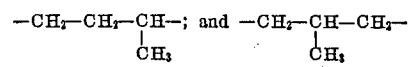

Substituent X is formed by the grouping

or hydrogen and stands in meta or para position with respect to the radical carrying the sulfonate group.

The chain member of general Formula I is incorporated into the polymer chain via the two groupings

Alternatively, it may have a terminal position in the polyester molecule. In the latter case it is linked via the

grouping and the substituent X represents a hydrogen atom. It is also possible, of course, that the polyester contains simultaneously chain members of Formula I incorporated into the polyester chain and in terminal position. Still further, the polyester may contain chain members of Formula I in which Y has different meanings and/or the grouping

has different positions.

The modified polyesters according to the invention contain 0.1 to 10 mol percent of chain members of general Formula I, calculated on the polymer unit consisting of dicarboxylic acid moiety and diol moiety. The term polymer unit designates the recurring unit forming the preponderant part of the polymer molecule and comprising one radical each of the dicarboxylic acid and of the diol forming the polyester.

The polyesters according to the invention comprise, in addition to the chain member of general Formula I, polymer units the dicarboxylic acid radicals of which are radicals of terephthalic acid, isophthalic acid or naphthalene-2,6-dicarboxylic acid, and the diol radicals of which are radicals of an aliphatic or alicyclic diol having 2 to 10 carbon atoms. As dicarboxylic acid radicals there may be present the radicals of one of the aforesaid acids or of a mixture thereof. The polyesters preferably contain a preponderant proportion of terephthalic acid.

Thus the polyesters according to the invention are polyesters, modified by incorporation of the chain member of general Formula I, of terephthalic acid, isophthalic acid and naphthalene-2,6-dicarboxylic acid with aliphatic glycols such as ethylene glycol, trimethylene glycol, 1,4-butane-diol, 1,5-pentane-diol, 1,6-hexane-diol, 1,7-heptane-diol or 1,4-(dimethylol)-cyclohexane. The polymer unit preferably comprises the radicals of terephthalic acid and of ethylene glycol. Alternatively, the polyesters according to the invention may contain polymer units with different diol radicals. Polyesters comprising a preponderant proportion of polymer units with ethylene glycol radicals and up to 10 mol percent of polymer units with another of the specified glycols are preferred. The polymer units may also contain as diol radical the radical of 2,2-dimethyl-1,3-propane-diol, the proportion of polymer units formed with this radical possibly amounting up to 5 mol percent. The polyesters according to the invention thus contain, in addition to the chain member of general Formula I, for example the following recurring polymer units, either alone or simultaneously:

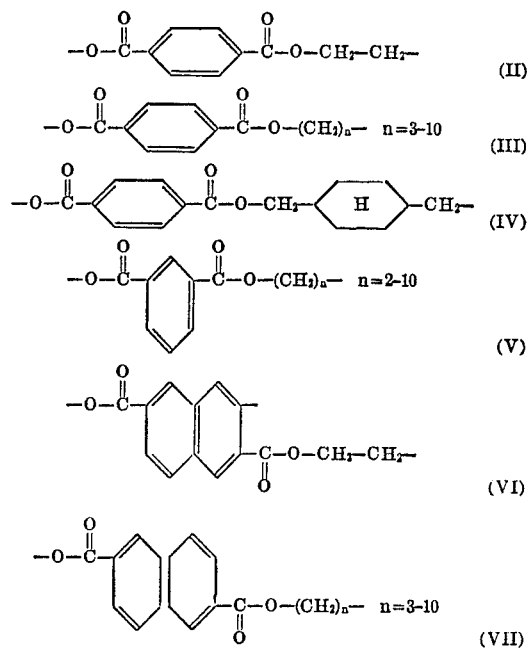

The polyester of the invention are prepared by method known for the manufacture of polyesters by direct esterification or ester interchange reaction with subsequent polycondensation. Suitable starting materials are, in addition to terephthalic acid, isophthalic acid and naphthalene-2,6-dicarboxylic acid and the diesters thereof with aliphatic alcohols having 1 to 8 carbon atoms, such as methanol, ethanol, propanol, butanol, hexanol, and the aliphatic or alicyclic diols having 2 to 10 carbon atoms used for the polyester formation, compounds of the general formula

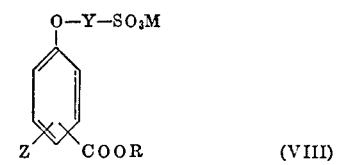

in which M and Y have the same meaning as in general Formula I, R stands for an alkyl radical having 1 to 8 carbon atoms, for example —CH$_3$; —CH$_2$—CH$_3$;

—CH$_2$—CH$_2$—CH$_3$; —CH$_2$—CH$_2$—CH$_2$—CH$_3$

—CH$_2$—CH$_2$—CH$_2$—CH$_2$—CH$_3$; and Z represents

—COOR or hydrogen and stands in meta or para position with respect to the grouping carrying the sulfonate radical.

In the preferred method of manufacture of the polyesters of the invention by ester interchange of the diesters of dicarboxylic acids with diol with subsequent polycondensation the compounds of general Formula VIII are preferably added to the reaction mixture before the beginning of the ester interchange. They may also be added, however, at a later stage of the manufacturing process before the polycondensation is terminated. According to a preferred embodiment of the invention the ester interchange of the aromatic dicarboxylic acid ester is carried out with a 2 to 10 fold, advantageously 2 to 3 fold molar excess of the diol at a temperature in the range of from 150 to 270° C., and the calculated amount of the compound of general Formula VIII is added to the reaction mixture prior to or during the ester interchange. When the ester interchange is terminated, the excess of diol is removed in an inert gas at atmospheric pressure or reduced pressure at a temperature of up to 300° C. The product obtained is then polycondensed in the atmosphere of an inert gas under a pressure of 0.1 to 5 mm. of mercury at a temperature in the range of from 230 to 310° C., preferably 250 to 305° C.

The ester interchange and polycondensation are accelerated by the usual catalysts known for these reactions, for example compounds of zinc, calcium, manganese, antimony, germanium, or titanium. Stabilizers and inhibitors, such as phosphorus compounds, or delustering agents, for example titanium dioxide may be added in usual manner.

The mono- and bifunctional monomers of general Formula VIII used for the manufacture of modified polyesters of the invention have not yet been described in literature. They are prepared in simple manner by reacting corresponding phenolates with propane- or butane-sultone in alcoholic solution, according to the following equation:

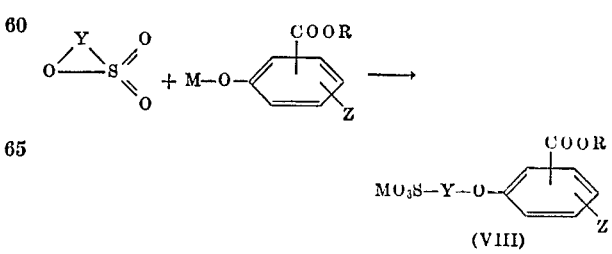

in which M, Y, and Z have the same meanings as in Formula VIII.

The scheme of this reaction has been disclosed by Helberger in Germany Pat. No. 743,570.

The sulfonates of general Formula VIII are obtained in a good yield. They may be recrystallized from alcoholic or aqueous-alcoholic solution whereby they are obtained in analytically pure form.

As comonomers for the manufacture of the polyesters of the invention the following bifunctional sulfonates of Formula VIII in which Z stands for the group —COOR can be used:

4-[3-(sodiumsulfo)-propoxy]-phthalic acid dimethyl ester,
2-[3-(sodiumsulfo)-propoxy]-terephthalic acid dimethyl ester,
5-[4-(potassiumsulfo)-butoxy]-isophthalic acid dimethyl ester,
5-[3-(lithiumsulfo)-propoxy]-isophthalic acid diethyl ester,
5-[3-(sodiumsulfo)-propoxy]-isophthalic acid dioctyl ester,
5-[4-(potassiumsulfo)-butoxy]-isophthalic acid dibutyl ester,
5-[3-(sodiumsulfo)-2-methyl-propoxy]-isophthalic acid dimethyl ester and preferably 5-[3-(sodiumsulfo)propoxy]-isophthalic acid dimethyl ester.

Typical representatives of the monofunctional sulfonates of general Formula VIII in which Z stands for hydrogen are, for example, 4-[3-(sodiumsulfo)-propoxy]-benzoic acid methyl ester,
3-[3-(sodiumsulfo)-propoxy]-benzoic acid methyl ester,
3-[3-(lithiumsulfo)-propoxy]-benzoic acid ethyl ester,
3-[4-(potassiumsulfo)-butoxy]-benzoic acid methyl ester, and
4-[4-(sodiumsulfo)-butoxy]-benzoic acid amyl ester.

These monomers may also be used in admixture with the bifunctional sulfonates, preferably in an amount of from 0.1 to 3.0 mol percent, calculated on the polymer unit. By incorporating the monofunctional sulfonates at the end of a polymer chain and thereby interrupting the chain, a regulation of the molecular weight can be brought about. In the absence of a delustering agent the modified polyesters of the invention form a limpid melt of excellent brightness and weak yellow tint. When sulfonate groups containing comonomers of Formula VIII are added to the polyester components, products of a high melt viscosity are obtained within a short period of polycondensation. The depression of the melting point is low even when the polyester contains a high number of chain members of general Formula I.

To characterize the polyesters of the invention there were used the differential thermoanalysis and the determination of the relative viscosity ($\eta_{rel}$) in a 1% solution of the polyester in a 3:2 mixture of phenol and tetrachloroethane at 25° C.

The polyesters of the invention can be used for making shaped structures such a filaments, fibers or films. The shaped structures are manufactured by known methods from the melt of the polyesters.

The filaments and fibers obtained by melt spinning are distinguished by good mechanical properties, bright color and a high affinity for cationic dyestuffs. They have also a much higher absorbing power for dispersion dyestuffs than known unmodified polyesters.

When the polyesters of the invention or filaments, fibers and films made therefrom are dyed with basic dyestuffs the alkali metal cations M of the sulfonate groups of the chain member of general Formula I are readily exchanged for the cations of the basic dyestuffs which are fixed on the polymer molecule by ionic bond. The dyed polyesters of the invention and filaments, fibers and films made therefrom contain in the polymer molecule a chain member of the general formula

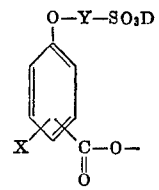

(IX)

in which D is the cation of a known basic dyestuff and Y and X have the same meanings as in general Formula I.

The polyesters of the invention have a high melt viscosity and a lower relative viscosity than known unmodified polyesters. Owing to this property the polyesters of the invention can be spun from the melt without difficulty into fibers and filaments having a relative viscosity of less than 1.50. The fibers obtained have a low resistance to flex fatigue and can be used for making fabrics having a low tendency to pilling.

The following examples serve to illustrate the invention but they are not intended to limit it thereto. Examples 1 to 4 relate to the preparation of sulfonate groups-containing comonomers of general Formula VIII. The other compounds were obtained in analogous manner.

EXAMPLE 1

In a 1 liter three-necked flask provided with stirrer, thermometer and reflux condenser 72.0 grams of 5-hydroxyisophthalic acid dimethyl ester were dissolved in a sodium methylate solution prepared from 7.95 grams of sodium and 500 milliliters of absolute methanol. After addition of 42.0 grams of 1,3-propane-sultone the mixture was boiled for 2 hours with reflux until the reaction was terminated and the solution had a neutral reaction. Active carbon was added to decolorize and the hot solution was filtered. The sulfonate crystallizing out on cooling was recrystallized from methanol with a little water. After drying at 80° C. under reduced pressure over caustic soda 55.5 grams of 5-[3-sodiumsulfo)-propoxy]-isophthalic acid dimethyl ester were obtained.

The compound was a white crystalline powder which was readily soluble in water. The infrared spectrum corresponded to the assumed structure.

Analysis.—Calculated for $C_{13}H_{15}O_8SNa \cdot \frac{1}{2}H_2O$ (percent): C, 43.0; H, 4.4; S, 8.7. Found (percent): C, 43.2; H, 4.65; S, 8.35.

When the filtrates were concentrated further fractions were obtained. The other alkali metal salts of the same compound were obtained by using the corresponding alcoholates as starting compounds or with the aid of an ion exchanger.

EXAMPLE 2

By the method described in Example 1, 9.54 grams of sodium, 600 milliliters of absolute methanol, 87.0 grams of 2-hydroxyterephthalic acid dimethyl ester and 50.4 grams of 1,3-propanesultone were reacted. The product separated by filtration was recrystallized from a small quantity of methanol with addition of a little water and dried at 80° C. under reduced pressure. Yield 93.3 grams of 2 - [3-(sodiumsulfo)-propoxy]-terephthalic acid dimethyl ester in the form of a white powder which was readily soluble in water.

Analysis.—Calculated for $C_{13}H_{15}O_8SNa \cdot \frac{1}{2}H_2O$ (percent): C, 43.0; H, 4.4; S, 8.7. Found (percent): C, 43.5; H, 4.7; S, 8.3.

The infrared spectrum corresponded to the assumed structure. By concentrating the filtrates the yield could be improved.

EXAMPLE 3

4.6 grams of sodium, 200 milliliters of absolute ethanol, 30.4 grams of 3-hydroxy-benzoic acid methyl ester and 24.4 grams of 1,3-propane-sultone were reacted as described in Example 1. The reaction product was recrystallized twice from alcohol of 96% strength whereupon 29.0 grams of pure, dry 3-[3-(sodiumsulfo)-propoxy]-benzoic acid methyl ester were obtained in the form of a white powder which was readily soluble in water. The infrared spectrum corresponded to the assumed structure.

*Analysis.*—Calculated for $C_{11}H_{13}O_6SNa$ (percent): C, 44.6; H, 4.4; S, 10.8. Found (percent): C, 44.3; H, 4.75; S, 10.8.

Further fractions could be isolated from the filtrates.

EXAMPLE 4

Instead of the alkali metal alcoholates as described in Examples 1 to 3 there may also be used as starting products hydroxides that are soluble in alcohol. This mode of preparation is described in the present example.

145.0 grams of 5 - hydroxyisophthalic acid dimethyl ester were dissolved in a solution of 38.8 grams of KOH in 1 liter of methanol, 84.2 grams of 1,3-propane-sultone were added and the whole was boiled for 30 minutes with reflux until the solution had a neutral reaction. The potassium salt of the sulfonate precipitating after cooling was recrystallized from an aqueous methanolic solution. Yield 109 grams of 5-[3-(potassiumsulfo)-propoxy]-isophthalic acid dimethyl ester. The infrared spectrum corresponded to the assumed structure.

*Analysis.*—Calculated for $C_{13}H_{15}O_8SK \cdot \frac{1}{2}H_2O$ (percent): C, 41.2; H, 4.2; S, 8.4. Found (percent): C, 41.4; H, 4.3; S, 8.2.

Further fractions could be obtained by concentrating the filtrates.

The following Examples 5 to 11 describe the manufacture of the polyesters of the invention and of the filaments and fibers made therefrom. The improved dyestuff receptivity of the fibers and filaments made of the polyesters of the invention is illustrated by dyeing tests.

The test dyeings described in the following examples were carried out in a goods-to-liquor ratio of 1:50 at 98 to 100° C. for a period of 90 minutes. The dyestuff was used in an amount of 2% by weight, calculated on the fiber and filaments used.

The following dyestuffs were used:

Astrazon Red 6 B (Color Index/Basic Violet 7, No. 48020)
Astrazon Red RL (Color Index/Basic Red 25, page S162)
Deorlene Brillant Yellow 5 GL (Color Index/Basic Yellow 13, page 1622)
Malachite Green (Color Index/Basic Green 4, No. 42000)
Basacryl Blue GL (Color Index/Basic Blue 54, page S175)
Astrazon Blue RL (Color Index/Basic Blue 46, page S173)
Maxilon Blue RL (Color Index/Basic Blue 40, page S172)

EXAMPLE 5

In a stirring vessel provided with column and condenser 1,000 grams of dimethyl terephthalate, 812 grams of ethylene glycol, 41 grams of 5-[3-(sodiumsulfo)-propoxy]-isophthalic acid dimethyl ester, 0.230 gram of zinc acetate and 0.306 gram of $Sb_2O_3$ were heated for 150 mintues at 180 to 210° C. until the evolution of methanol was terminated.

To remove the excess of glycol the product obtained was heated in a polycondensation vessel for 15 minutes at 250° C. At the same temperature the pressure was reduced to 0.1 to 0.5 mm. Hg within a period of 90 minutes. The polycondensation taking place with separation of ethylene glycol was terminated by heating the polyester at 275° C. under 0.1 to 0.5 mm. Hg. The time required at 275° C. under 0.1 to 0.5 mm. Hg to reach the final viscosity is defined in the present and in the following examples as polycondensation time. In the present example a colorless polycondensation product was obtained after 60 minutes. The product had a relative viscosity of 1.60, a melt viscosity of 7,000 poises at 285° C., a second order transition temperature of 78° C., a crystallization temperature of 135° C. and a melting point of 256° C.

The product was dried for 2 hours at 150° C. under 10 mm. Hg and with an extruder filaments were spun through a spinneret with 24 orifices at a temperature of 305° C. at a draw-off rate of 1,000 meters per minute. The filaments were drawn in usual manner in a ratio of 1:3.65 and set at 110° C. They had the following properties:

Total titer—52.2 denier
Tensile strength—3.2 p./den.
Elongation—21.8%

To eliminate the preparation, the filaments were washed for 30 minutes at 40° C. with a solution of 5 grams of Castile soap in 1 liter of water.

2.5 grams of the filaments were dyed deep shades, the dyed filaments were washed for 30 minutes at 50° C. with a solution of 5 grams of Castile soap and 2 grams of soda in 1 liter of water. The dyeings obtained had a high fastness to washing.

EXAMPLE 6

500 grams of dimethyl terephthalate, 406 grams of ethylene glycol, 20.5 grams of 2-[3-(sodiumsulfo)-propoxy]-terephthalic acid dimethyl ester, 0.115 gram of zinc acetate and 0.153 gram of $Sb_2O_3$ were subjected to an ester interchange reaction as described in Example 5 for 2 hours at 180 to 210° C.

After a time of polycondensation of 60 minutes an almost colorless polycondensation product was obtained having a relative viscosity of 1.60, a melt viscosity of 2,400 poises at 285° C., a second order transition temperature of 73° C., a crystallization temperature of 115° C. and a melting point of 239° C.

The filaments spun at a maximum temperature in the extruder of 290° C. at a draw-off rate of 1,000 meters per minute, drawn in a ratio of 1:3.65 and set at 110° C. had the following properties:

Total titer—50.8 denier
Tensile strength—2.9 p./den.
Elongation—19.3%

The dyeings obtained with the specified dyestuffs were very deep.

EXAMPLE 7

350 grams of dimethyl terephthalate, 284 grams of ethylene glycol, 10.5 grams of 4-[3-sodiumsulfo)-proproxy]-benzoic acid methyl ester, 0.081 gram of zinc acetate and 0.108 gram of $Sb_2O_3$ were subjected to an ester interchange reaction for 90 minutes at a temperature of 180 to 215° C.

After a time of polycondensation of 90 minutes a white crystalline polyester was obtained having a relative viscosity of 1.63, a second order transition temperature of 76° C., a crystallization temperature of 106° C. and a melting point of 250° C.

The product had good spinning and drawing properties. The test dyestuffs dyed the filaments medium tints.

EXAMPLE 8

500 grams of dimethyl terephthalate, 406 grams of ethylene glycol, 10.0 grams of 4-[3-(sodiumsulfo)-propoxy]-benzoic acid methyl ester. 15.0 grams of 5-[3-(sodiumsulfo)-propoxy]-isophthalic acid dimethyl ester, 0.115 gram of zinc acetate and 0.153 gram of $Sb_2O_3$ were subjected to an ester interchange reaction as described in Example 5 for 140 minutes at a temperature of 180 to 225° C.

After a time of polycondensation of 60 minutes a white crystalline polyester was obtained having a relative viscosity of 1.47, a second order transition temperature of 80° C., a crystallization temperature of 121° C., a melting point of 253° C. and a melt viscosity of 2,280 poises at 285° C.

The fibers obtained by melt spinning were dyed very deep shades by the specified dyestuffs. In the fabric they had a low tendency to pilling only.

EXAMPLE 9

1,000 grams of dimethyl terephthalate, 812 grams of ethylene glycol, 41.0 grams of 5-[3-(potassiumsulfo)-propoxy]-isophthalic acid dimethyl ester, 0.230 gram of zinc acetate and 0.306 gram of $Sb_2O_3$ were subjected to an ester interchange reaction for 150 minutes at 175 to 210° C.

The white crystalline product obtained after a time of polycondensation of 75 minutes had a relative viscosity of 1.68, a second order transition temperature of 88° C., a crystallization temperature of 140° C. and a melting point of 245° C.

The product had good spinning and drawing properties and an excellent affinity for the test dyestuffs used.

EXAMPLE 10

950 grams of dimethyl terephthalate, 50 grams of dimethyl isophthalate, 41.0 grams of 5-[3-(sodiumsulfo)-propoxy]-isophthalic acid dimethyl ester, 0.230 gram of zinc acetate and 0.306 gram of $Sb_2O_3$ were subjected to an ester interchange reaction for 150 minutes at a temperature of from 180 to 220° C.

After a time of polycondensation of 45 minutes a colorless polycondensation product was obtained having a relative viscosity of 1.61, a second order transition temperature of 79° C., a crystallization temperature of 146° C. and a melting point of 238° C.

The filaments made from the product could be dyed deep shades with the specified test dyestuffs.

EXAMPLE 11

500 grams of dimethyl terephthalate, 760 grams of 1,4-cyclohexane dimethanol, 20.5 grams of 5-[3-sodium-sulfo)-propoxy]-isophthalic acid dimethyl ester and 3 milliliters of a 15% solution of $KHTi(OC_4H_9)_6$ in butanol were subjected to an ester interchange reaction for 45 minutes at a temperature of from 200 to 240° C. until the evolution of methanol was terminated.

To remove the excess of glycol the reaction mixture was heated in a polycondensation vessel for 60 minutes in a nitrogen current under a pressure of 1 mm. Hg while the temperature was slowly raised from 270 to 305° C. After a further 25 minutes under a pressure of 1 mm. Hg and at a temperature of 305° C. a bright crystalline polyester was obtained having a relative viscosity of 1.57, a crystallization temperature of 120° C. and a melting point of 279° C.

The product could be well spun and drawn. The filaments were dyed medium shades by the specified test dyestuff.

What is claimed is:

1. A fiber-forming synthetic linear polyester having a linear polymer chain containing dicarboxylic acid moieties selected from terephthalic acid, isophthalic acid, naphthalene-2,6-dicarboxylic acid and mixtures thereof, diol moieties selected from aliphatic and alicyclic diols having 2 to 10 carbon atoms and mixtures thereof, and from about 0.1 to about 10 mol percent of units with sulfonate groups, said units being of the general formula:

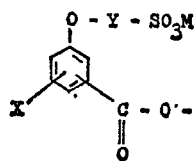

in which M represents an alkali metal, Y represents an alkylene radical having 3 to 4 carbon atoms, at least three of which are in a straight chain connecting the adjacent sulfur and oxygen atoms, and X is in the meta or para position with respect to the radical —O—Y—$SO_3M$ and is the group

or H.

2. A fiber-forming synthetic linear polyester as claimed in claim 1, the polymer chain of which is largely composed of units of the general formula:

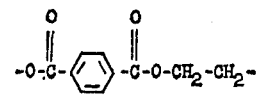

3. A filament of the polyester of claim 1.
4. A fiber of the polyester of claim 1.
5. A film of the polyester of claim 1.
6. In a shaped article made from a synthetic linear polyester having a linear polymer chain containing dicarboxylic acid moieties selected from terephthalic acid, isophthalic acid, naphthalene-2,6-dicarboxylic acid and mixtures thereof, diol moieties selected from aliphatic and alicyclic diols having 2 to 10 carbon atoms and mixtures thereof, and dyed with a cationic dye, the improvement which comprises incorporating in said linear polymer chain from about 0.1 to about 10 mol percent of units with sulfonate groups, said units being of the general formula

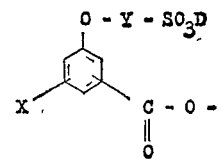

in which D represents the cation of said dye, Y represents an alkylene radical having 3 to 4 carbon atoms, at least three of which are in a straight chain connecting the adjacent sulfur and oxygen atoms, and X is in the meta or para position with respect to the grouping —O—Y—$SO_3D$ and is the group

or H.

7. A fiber-forming synthetic linear polyester having a linear polymer chain containing dicarboxylic acid moieties selected from terephthalic acid, isophthalic acid, naphthalene-2,6-dicarboxylic acid and mixtures thereof, diol moieties selected from aliphatic and alicyclic diols having 2 to 10 carbon atoms and mixtures thereof, and from about 0.1 to about 10 mol percent of units with sulfonate groups, said units being of the general formula:

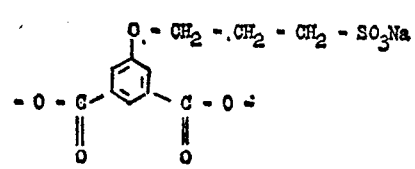

8. A filament of the polyester of claim 7.
9. A fiber of the polyester of claim 7.
10. A film of the polyester of claim 7.
11. In a shaped article made from a synthetic linear polyester having a linear polymer chain containing dicarboxylic acid moieties selected from terephthalic acid, isophthalic acid, naphthalene-2,6-dicarboxylic acid and mixtures thereof, diol moieties selected from aliphatic and alicyclic diols having 2 to 10 carbon atoms and mixtures thereof, and dyed with a cationic dye, the improvement which comprises incorporating in said linear polymer chain from about 0.1 to about 10 mol percent of units with sulfonate groups, said units being of the general formula:

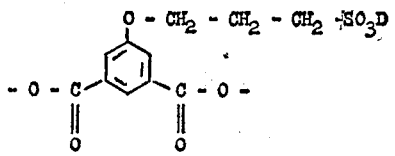

in which D represents the cation of said dye.

12. A fiber-forming synthetic linear polyester having a linear polymer chain containing dicarboxylic acid moieties selected from terephthalic acid, isophthalic acid, naphthalene-2,6-dicarboxylic acid and mixtures thereof, diol moieties selected from aliphatic and alicyclic diols having 2 to 10 carbon atoms and mixtures thereof, and from about 0.1 to about 10 mol percent of units with sulfonate groups, said units being of the general formula:

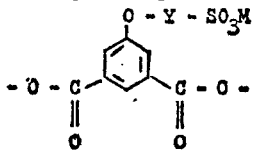

wherein M represents an alkali metal, and Y represents an alkylene radical having 3 or 4 carbon atoms, at least three of which are in a straight chain connecting the adjacent sulfur and oxygen atoms.

References Cited

UNITED STATES PATENTS

| 3,018,272 | 1/1962 | Griffing et al. | 260—75 |
| 3,222,299 | 12/1965 | MacDowell | 260—2.3 |
| 3,238,180 | 3/1966 | Wiloth | 260—47 |

FOREIGN PATENTS

| 1,492,279 | 7/1967 | France | 260—49 |

WILLIAM H. SHORT, Primary Examiner

L. L. LEE, Assistant Examiner

U.S. Cl. X.R.

8—55; 260—75, 470